United States Patent [19]

Eilingsfeld et al.

[11] 3,862,944
[45] Jan. 28, 1975

[54] CERTAIN PYRIMIDINE-CONTAINING DYESTUFFS

[75] Inventors: Heinz Eilingsfeld, Frankenthal; Gerd Schwantje, Ludwigshafen, both of Germany

[73] Assignee: Badische Anilin- & Soda-Fabrik Aktiengesellschaft, Ludwigshafen/(Rhine), Germany

[22] Filed: May 10, 1972

[21] Appl. No.: 252,031

[52] U.S. Cl............ 260/256.5 R, 260/40, 260/247.1, 260/251 A, 260/256.4 Q
[51] Int. Cl............................................ C07d 51/46
[58] Field of Search... 260/256.5 R, 256.4 Q, 247.1, 260/247.2, 251 A

[56] References Cited
FOREIGN PATENTS OR APPLICATIONS
1,159,456  12/1963  Germany ............................ 260/251

*Primary Examiner*—Richard J. Gallagher
*Attorney, Agent, or Firm*—Johnston, Keil, Thompson & Shurtleff

[57] ABSTRACT

New dyes of the formula:

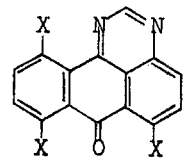

in which two of the groups X are hydroxyl and the third X is unsubstituted or substituted alkylamino, unsubstituted or substituted phenylamino, phenylthio, aliphatic, cycloaliphatic or aromatic acylamino or N'-alkylureido for dyeing synthetic material. Dyeings obtained therewith have good fastness properties.

The invention relates to new dyes based on anthrapyrimidines for synthetic fibers.

8 Claims, No Drawings

CERTAIN PYRIMIDINE-CONTAINING DYESTUFFS

The invention relates to new dyes of the general formula

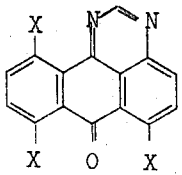

(I)

in which two of the radicals X are hydroxyl and the third X is alkylamino of one to eight carbon atoms in which one or two hydrogen atoms may be replaced by hydroxyl, alkoxy of one to three carbon atoms, cyano, carboxamido, alkoxycarbonyl of a total of two to five carbon atoms, sulfonamido or pyrrolidon-2-yl-1, phenylamino in which one or two hydrogen atoms may be replaced by chlorine, bromine, hydroxy, trifluoromethyl, nitro, sulfonamido, carbamoyl, alkoxycarbonyl of a total of two to five carbon atoms, methyl, ethyl and/or methoxy or ethoxy, phenylthio, aliphatic acylamino of two to six carbon atoms in the acyl moiety in which one or two hydrogen atoms may be replaced by chlorine, bromine, methyl, ethyl, methoxy or ethoxy, cycloaliphatic acylamino of seven to eight carbon atoms in the acyl moiety, benzoylamino in which one or two hydrogen atoms may be replaced by chlorine, bromine, methyl, ethyl, methoxy and/or ethoxy, or N'-alkylureido of two to five carbon atoms in the alkyl moiety.

The new dyes dye synthetic fibrous material of linear aromatic polyesters and cellulose acetate deep blue to red violet shades by conventional dyeing methods. The dyeings have good to outstanding fastness properties.

The unsubstituted or substituted alkylamino groups represented by X may be those of one to eight carbon atoms in the alkyl moiety, for example methylamino, ethylamino, n-propylamino, n-butylamino, β-carbonylmethoxyethylamino, β-carbonylethoxyethylamino, β-carbonylbutoxyethylamino, β-carbonyl-β'-hydroxyethoxyethylamino, β-carbonyl-β'-chloroethoxyethylamino, β-carbonylaminoethylamino, β-(carbonyl-N,N-dimethylamino)-ethylamino, β-(N,N-dimethylsulfonamido-ethylamino, β-sulfonamidoethylamino, β-cyanoethylamino, β-hydroxyethylamino, β-methoxyethylamino, β-ethoxyethylamino, β-n-butoxyethylamino and β-(pyrrolidon-2-yl-1)-ethylamino.

Examples of substituted phenylamino groups are: 2-chlorophenylamino, 3-chlorophenylamino, 4-chlorophenylamino, 2-methylphenylamino, 3-methylphenylamino, 4-methylphenylamino, 2-methoxyphenylamino, 3-methoxyphenylamino, 4-methoxyphenylamino, 2-ethoxyphenylamino, 3-ethoxyphenylamino, 4-ethoxyphenylamino, 2-hydroxyphenylamino, 3-hydroxyphenylamino, 4-hydroxyphenylamino, 2,4-dichlorophenylamino, 3,4-dichlorophenylamino, 2-methyl-4-chlorophenylamino, 4-chloro-2-methylphenylamino, 4-chloro-2-methoxyphenylamino, 4-methoxy-2-chlorophenylamino, 2,4-dimethoxyphenylamino, 4-(β-hydroxyethyl)-phenylamino, 3-trifluoromethylphenylamino, 3-sulfonamidophenylamino, 3-(γ-methoxypropylaminosulfonamido)-phenylamino, 3-(N'-(β-methoxy)-ethylsulfonamido)-phenylamino, 3-(morpholinosulfonyl)-phenylamino, 3-(N'-isobutylsulfonamido)-phenylamino, 3-(N'-(γ-ethoxy)-propylsulfonamido)-phenylamino, 3-(N'-ethylsulfonamido)-phenylamino, 3-methoxycarbonylphenylamino, 3-ethoxycarbonylphenylamino, 3-(N'-methylcarboxamido)-phenylamino, 3-(N,N'-dimethylcarboxamido)-phenylamino, 3-(N'-n-butylcarboxamido)-phenylamino, 3-nitro-4-methylphenylamino, 3-(N'-methylsulfonamido)-phenylamino, 3-(N'-propylsulfonamido)-phenylamino, 3-(N'-n-butylsulfonamido)-phenylamino, 3-(N'-isobutylsulfonamido)-phenylamino, 3-(N'-(γ-methyl)-butylsulfonamido)-phenylamino, 3-(N'-(β,β-dimethyl-γ-hydroxy)-propylsulfonamido)-phenylamino, 3-(N'-methyl-N'-(β-hydroxyethyl)-sulfonamido)-phenylamino, 3-(N',N'-diethylsulfonamido)-phenylamino, 3-(piperidinosulfonamido)-phenylamino, 3-(pyrrolidinosulfonamido)-phenylamino, 3-(N'-ethylcarboxamido)-phenylamino, 3-(N'-n-propylcarboxamido)-phenylamino, 3-(N'-(γ-ethoxy)-propylcarboxamido)-phenylamino, 3-(N'-cyclohexylcarboxamido)-phenylamino, 3-(N',N'-diethylcarboxamido)-phenylamino, 3-(N'-piperidinocarboxamido)-phenylamino or 3-((β-ethoxy)-ethoxycarbonyl)-phenylamino.

Examples of unsubstituted or substituted acylamino for X are: acetylamino, propionylamino, n-butyrylamino, isobutyrylamino, chloroacetamino, bromoacetamino, β-chloropropionylamino, α-chloropropionylamino, β-bromopropionylamino, phenoxyacetamino, dichloroacetamino, β-chlorobutyrylamino, α-ethylcapronylamino, β-methoxypropionylamino, γ-phenoxybutyrylamino, hexahydrobenzoylamino, benzoylamino, 2-chlorobenzoylamino, 3-chlorobenzoylamino, 4-chlorobenzoylamino, 2-methoxybenzoylamino, 3-methoxybenzoylamino, 4-methoxybenzoylamino, 3-bromobenzoylamino, 4-bromobenzoylamino, 2-methylbenzoylamino, 3-methylbenzoylamino or 4-methylbenzoylamino.

Examples of N'-alkylureido groups for X are N-butylureido, N',N'-dimethylureido, N'-γ-methoxypropylureido and N,N'-diethylureido.

Because of their tinctorial behavior, dyes of the formula (Ia) are preferred:

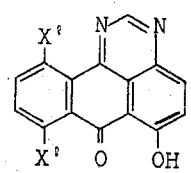

(Ia)

in which one X' is hydroxyl and the other X' is phenylamino and the two hydrogen atoms in the phenyl may be replaced by chlorine, bromine, trifluoromethyl, nitro, methyl, ethyl, methoxy, ethoxy, sulfonamido, carbamoyl, or alkoxycarbonyl of two to five carbon atoms.

Because of their outstanding fastness to light and dry-heat pleating and setting, dyes of the formula (Ia) are especially preferred in which one X' is hydroxyl and the other X' is 3-sulfonamidophenylamino of the formula (V)

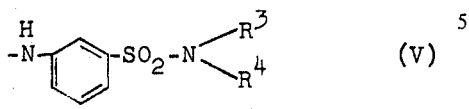

in which $R^3$ is hydrogen or alkyl of one to eight carbon atoms and $R^4$ is alkyl of one to eight carbon atoms and the alkyls may bear methoxy, ethoxy, propoxy or butoxy as a substituent or the group

is a saturated five-membered or six-membered heterocyclic ring.

Dyes of the formula (Ia) have quite particular preference in which one X' is hydroxyl and the other X' is 3-sulfonamidophenyl of the formula:

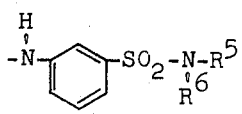

in which $R^5$ is hydrogen or alkyl of one to eight carbon atoms and $R^6$ is alkoxyalkyl of three to eight carbon atoms or the group

is piperidino, pyrrolidino or morpholino.

The new compounds of the formula (I) are prepared for example by the method described in German Pat. No. 1,159,456 from a substituted formamidine of the general formula (II):

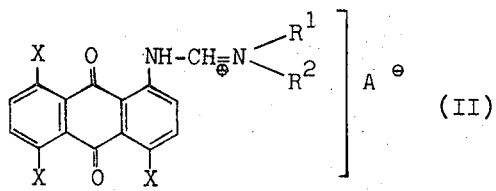

in which X has the above meanings, $R^1$ and $R^2$ are identical or different lower alkyls such as methyl, ethyl, propyl or butyl and $A^-$ is a halogen anion, by the action of an ammonium salt of a weak acid in a solvent. Those solvents which dissolve salts of nitrogenous bases such as glycol, diglycol, propylene glycol, glycol monoalkyl ethers such as glycol monomethyl, monoethyl or monobutyl ethers of N-methylpyrrolidone are particularly suitable.

Examples of suitable ammonium salts of weak acids are ammonium formate, ammonium acetate and ammonium carbonate.

Cyclization of compounds (II) is carried out by stirring a suspension in the said solvents at from 20° to 150°C, preferably at from 70° to 120°C.

The formamidine derivatives of formula (II) are obtained by a known method from an α-aminoanthraquinone derivative of the general formula (III):-

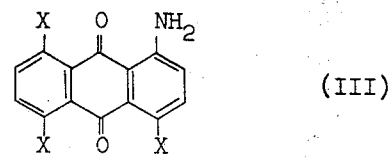

in which X has the above meanings, and a N,N-dialkylformamide halide at from 20° to 100°C. The formamide halide may be added direct, but is more advantageously prepared in situ in the presence of the aminoanthraquinone (III) from a N,N-dialkylformamide and a chlorinating agent such as thionyl chloride or phosphorus trichloride. Conversion to (II) takes place at the same time. Reaction to form the formamidine derivative (II) advantageously takes place in an inert solvent such as benzene, toluene, xylene, chlorobenzene or dichlorobenzene at a temperature of from 20° to 100°C.

The reactants (the β-aminoanthraquinone derivative (III) and the formamide halide) are conveniently used in the molar ratio 1 : 1.1 to 1 : 2.5. This is also true when the formamide halide is prepared in situ for example from N,N-dimethylformamide and thionyl chloride or phosphorus trichloride in the reaction mixture.

The following are examples of suitable α-aminoanthraquinone derivitives of the formula (III):
  1,5-dihydroxy-4-propionylamino-8-aminoanthraquinone,
  1,8-dihydroxy-4-(β-carbethoxyethylamino)-5-aminoanthraquinone,
  1,5-dihydroxy-4-acetamino-8-aminoanthraquinone,
  1,5-dihydroxy-4-chloroacetamino-8-aminoanthraquinone,
  1,5-dihydroxy-4-(β-chloropropionylamino)-8-aminoanthraquinone,
  1,5-dihydroxy-4-(n-butyrylamino)-8-aminoanthraquinone,
  1,5-dihydroxy-4-(isobutyrylamino)-8-aminoanthraquinone,
  1,5-dihydroxy-4-tetrahydrobenzoylamino-8-aminoanthraquinone,
  1,5-dihydroxy-β-hydroxyethylamino-8-aminoanthraquinone,
  1,5-dihydroxy-4-(β-methoxyethylamino)-8-aminoanthraquinone,
  1,5-dihydroxy-4-(β-carboethoxyethylamino)-8-aminoanthraquinone,
  1,5-dihydroxy-4-(β-cyanoethylamino)-8-aminoanthraquinone,
  1,5-dihydroxy-4-β-(pyrrolidon-2-yl-1)-ethylamino-8-aminoanthraquinone,
  1,5-dihydroxy-4-anilino-8-aminoanthraquinone,
  1,5-dihydroxy-4-(4'-anisidino)-8-aminoanthraquinone,
  1,5-dihydroxy-4-(2'-anisidino)-8-aminoanthraquinone,
  1,5-dihydroxy-4-(2'-methylamilino)-8-aminoanthraquinone,
  1,5-dihydroxy-4-(3'-methylphenylamino)-8-aminoanthraquinone,
  1,5-dihydroxy-4-(4'-methylanilino)-8-aminoanthraquinone, 1,5-dihydroxy-4-(2'-chloroanilino)-8-aminoanthraquinone,
1,5-dihydroxy-4-(4'-chloroanilino)-8-aminoanthraquinone,
1,5-dihydroxy-4-(4'-ethoxyphenylamino)-8-aminoanthraquinone,
1,5-dihydroxy-4-(2',4'-dimethoxyphenylamino)-8-aminoanthraquinone,
1,5-dihydroxy-4-(3'-carboethoxyphenylamino)-8-aminoanthraquinone,
1,5-dihydroxy-4-(3'-sulfonamidophenylamino)-8-aminoanthraquinone,
1,5-dihydroxy-4-(3'-N'-methylsulfonamidophenylamino)-8-aminoanthraquinone,
1,5-dihydroxy-4-(3'-N'-n-propylsulfonamidophenylamino)-8-aminoanthraquinone,
1,5-dihydroxy-4-(3'-N'-n-butylsulfonamidophenylamino)-8-aminoanthraquinone,
1,5-dihydroxy-4-(3'-N'-($\beta$-methoxyethyl)-sulfonamidophenylamino)-8-aminoanthraquinone,
1,5-dihydroxy-4-(3'-N'-methyl-N'-($\beta$-hydroxyethyl)-sulfonamidophenylamino)-8-aminoanthraquinone,
1,5-dihydroxy-4-(3'-N',N'-bisethylsulfonamidophenylamino)-8-aminoanthraquinone,
1,5-dihydroxy-4-(3'-morpholinosulfonamidophenylamino)-8-aminoanthraquinone,
1,5-dihydroxy-4-(3'-N-methylcarboxamidophenylamino)-8-aminoanthraquinone,
1,5-dihydroxy-4-(3'-N-n-propylcarboxamidophenylamino)-8-aminoanthraquinone,
1,5-dihydroxy-4-(3'-N-($\gamma$-ethoxypropylcarboxamido)-phenylamino)-8-aminoanthraquinone,
1,5-dihydroxy-4-(3'-N-piperidylcarboxamidophenylamino)-8-aminoanthraquinone,
1,5-dihydroxy-4-(3'-carbo-($\beta$-ethoxyethoxy)-phenylamino)-8-aminoanthraquinone,
1,5-dihydroxy-4-(3'-pyrrolidinosulfonamidophenylamino)-8-aminoanthraquinone,
1,8-dihydroxy-4-phenoxyacetamino-5-aminoanthraquinone,
1,8-dihydroxy-4-benzoylamino-5-aminoanthraquinone,
1,8-dihydroxy-4-(4'-methoxybenzoylamino)-5-aminoanthraquinone,
1,8-dihydroxy-4-(3'-chlorobenzoylamino)-5-aminoanthraquinone,
1,5-dihydroxy-4-(N'-n-butylureido)-5-aminoanthraquinone,
1,8-dihydroxy-4-$\beta$-(carbonylamino)-ethylamino-5-aminoanthraquinone,
1,8-dihydroxy-4-$\beta$-(N',N'-dimethylsulfonamido)-ethylamino-5-aminoanthraquinone,
1,8-dihydroxy-4-(4'-anisidino)-5-aminoanthraquinone,
1,8-dihydroxy-4-(4'-methylanilino)-5-aminoanthraquinone,
1,8-dihydroxy-4-(3'-methylanilino)-5-aminoanthraquinone,
1,8-dihydroxy-4-(4'-$\beta$-hydroxyethylanilino)-5-aminoanthraquinone,
1,8-dihydroxy-4-(3'-anisidino)-5-aminoanthraquinone,
1,8-dihydroxy-4-(3'-sulfonamidophenylamino)-5-aminoanthraquinone,
1,8-dihydroxy-4-phenylthio-5-aminoanthraquinone,
1,8-dihydroxy-4-(3'-n-butylcarboxamidophenylamino)-5-aminoanthraquinone,
1,8-dihydroxy-4-(3'-trifluoromethylphenylamino)-5-aminoanthraquinone,
1,8-dihydroxy-4-(3'-nitro-4'-methylphenylamino)-5-aminoanthraquinone,
1,4-dihydroxy-5-acetamino-8-aminoanthraquinone,
1,4-dihydroxy-5-chloroacetamino-8-aminoanthraquinone,
1,4-dihydroxy-5-n-butyrylamino-8-aminoanthraquinone,
1,4-dihydroxy-5-isobutyrylamino-8-aminoanthraquinone,
1,4-dihydroxy-5-phenoxyacetamino-8-aminoanthraquinone,
1,4-dihydroxy-5-benzoylamino-8-aminoanthraquinone,
1,4-dihydroxy-5-(4'-methoxybenzoylamino)-8-aminoanthraquinone,
1,4-dihydroxy-5-(N'-n-butylureido)-8-aminoanthraquinone,
1,8-dihydroxy-4-(4'-chlorophenylamino)-5-aminoanthraquinone,
1,8-dihydroxy-4-(3'-N'-methylsulfonamidophenylamino)-5-aminoanthraquinone,
1,8-dihydroxy-4-(3'-N'-isobutylsulfonamidophenylamino)-5-aminoanthraquinone,
1,8-dihydroxy-4-(3'-N'-isoamylsulfonamidophenylamino)-5-aminoanthraquinone,
1,8-dihydroxy-4-(3'-N'-($\beta,\beta$-dimethyl-$\gamma$-hydroxypropyl)-sulfonamidophenylamino)-5-aminoanthraquinone,
1,8-dihydroxy-4-(3'-piperidinosulfonamidophenylamino)-5-aminoanthraquinone,
1,8-dihydroxy-4-(3'-N-ethylcarboxamidophenylamino)-5-aminoanthraquinone, and
1,8-dihydroxy-4-(3'-N,N-bisethylcarboxamidophenylamino)-5-aminoanthraquinone.

The new compounds may also be obtained by reaction of a compound of the formula (IV):

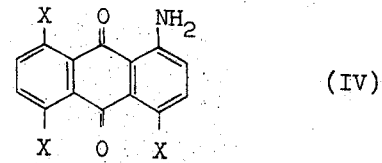

(IV)

in which X has the meanings given above with formamide at elevated temperature. It has proved to be advantageous to carry out the condensation in the presence of oxidizing agents such as nitrobenzene, m-nitrobenzenesulfonic acid or alkali metal salts of the same, chloroanil or dimethylsulfoxide. The reaction is conveniently carried out at a temperature of from 140° to 200°C, preferably at from 160° to 175°C. The formamide serves at the same time as a solvent. Some of the formamide may also be replaced by another high boiling inert solvent such as nitrobenzene, o-dichlorobenzene, trichlorobenzene, dimethylformamide or N-methylpyrrolidone.

The amount of oxidizing agent is generally from 1 to 30% by weight, preferably from 10 to 20% by weight, based on the formamide used. The amount of formamide is generally from twice to ten times the weight of the anthraquinone derivative (IV). When a neutral solvent is used, the amount of formamide may be decreased to 0.5 to twice the weight of (IV).

The reaction is generally completed after from 4 to 10 hours. The reaction mixture is worked up by pouring it into water, suction filtering the precipitate and washing it well. when an inert solvent which is not miscible with water has been used, the solvent is distilled off with steam after pouring into water and the dye is isolated from the aqueous residue, for example by filtration.

The same dyes are obtained by this method as by that mentioned previously.

The new dyes are suitable for dyeing linear poleysters and cellulose acetate. The derivatives of 1,5-dihydroxy-8,10-anthrapyrimidine, of 5,8-dihydroxy-8,10-anthrapyrimidine and mixtures of the same are particularly suitable.

The following Examples illustrate the invention. The parts specified are parts by weight.

EXAMPLE 1

19.5 parts of 1,5-dihydroxy-4-propionylamino-8-aminoanthraquinone is stirred into a mixture of 240 parts of chlorobenzene and 9.2 parts of dimethylformamide. 10.7 parts of thionyl chloride is dripped in at room temperature and the whole is then heated for 2 hours at 70°C. Suction filtration is carried out at room temperature and the residue is washed with acetone. The residue still moist with acetone is introduced into a mixture of 30 parts of ammonium acetate and 250 parts of ethylene glycol monomethyl ether at room temperature, stirred for 1 hour at room temperature and heated for 4 hours at 75°C. The whole is then cooled to room temperature, suction filtered, washed with methanol and water and dried. The dye obtained has the formula:

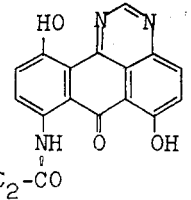

It dyes polyesters full red shades. The yield is 18.2 parts of a dark brown powder.

EXAMPLE 2

25.2 parts of 1,8-dihydroxy-4-(β-carbethoxyethylamino)-5-aminoanthraquinone is stirred into a mixture of 250 parts of toluene and 9.5 parts of dimethylformamide. 10.7 parts of thionyl chloride is dripped in at room temperature and the whole is heated for another 2 hours at 70°C. After cooling, the whole is suction filtered and the residue is washed with acetone.

The residue while still moist with acetone is introduced at room temperature into a mixture of 25 parts of ammonium formate and 250 parts of ethylene glycol monomethyl ether. After stirring for 1 hour at room temperature the whole is heated for 3 hours at 70°C. After cooling to room temperature the whole is suction filtered and the product is washed with methanol and water and dried. 23.4 parts of the dye of the formula:

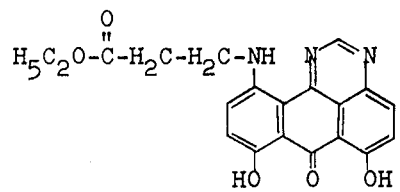

is obtained. It dyes polyesters full blue shades.

The dyes identified in the following Table by the substituents in the formula:

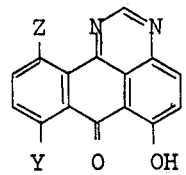

are obtained by a method analogous to that described in Example 1:

| Example | Y | Z | Shade of dyeing on linear polyester |
| --- | --- | --- | --- |
| 3 | -HNOCCH$_3$ | -OH | red violet |
| 4 | -HNOCCH$_2$Cl | -OH | red violet |
| 5 | -HNOCCH$_2$CH$_2$Cl | -OH | red violet |
| 6 | -HNOCCH$_2$CH$_2$CH$_3$ | -OH | red violet |
| 7 | -HNOCCH$_2$CH(CH$_3$)CH$_3$ | -OH | red violet |
| 8 | -HNOC-⟨H⟩ | -OH | red violet |
| 9 | -OH | -HNOCCH$_2$O-⟨⟩ | red violet |
| 10 | -OH | -HNOC-⟨⟩ | red violet |

| Example | Y | Z | Shade of dyeing on linear polyester |
|---|---|---|---|
| 11 | -OH | -HNOC-⟨C6H4⟩-OCH3 | red violet |
| 12 | -OH | -HNOC-⟨C6H4⟩-Cl | red violet |
| 13 | -OH | -NHCONH-(CH2)3CH3 | red violet |
| 14 | -HNCH2CH2OH | -OH | blue |
| 15 | -HNCH2CH2OCH3 | -OH | blue |
| 16 | -NHCH2CH2CO2C2H5 | -OH | blue |
| 17 | -OH | -NHCH2CH2CONH2 | blue |
| 18 | -HNCH2CHCN | -OH | blue |
| 19 | -HNCH2CH2-N⟨pyrrolidinone⟩ | -OH | blue |
| 20 | -OH | -HNCH2CH2SO2N(CH3)2 | blue |
| 21 | -HNOCCHCl2 | -OH | red violet |
| 22 | -HNOCCH2CH2CH2Cl | -OH | red violet |
| 23 | -OH | -HNOCCH(C2H5)(CH2)3CH3 | red violet |
| 24 | -HNOCCH2CH2OCH3 | -OH | red violet |
| 25 | -OH | -HNOCCH2CH2CH2O-⟨C6H5⟩ | red violet |
| 26 | -HNOCN(CH3)2 | -OH | red violet |
| 27 | -HNOCN(C2H5)2 | -OH | red violet |
| 28 | -HNOCNHCH2CH2CH2OCH3 | -OH | red violet |
| 29 | -HNOCNHCH2CH2-⟨C6H5⟩ | -OH | red violet |
| 30 | -HNCH2CH2CH2CH3 | -OH | blue |
| 31 | -OH | -HNCH2CH2OC2H5 | blue |
| 32 | -HNCH2CH2OCH2CH2CH2CH3 | -OH | blue |
| 33 | -HNCH2CH2CO2CH2CH2CH2CH3 | -OH | blue |
| 34 | -OH | -HNCH2CH2CO2CH2CH2OH | blue |
| 35 | -OH | -HNCH2CH2CO2CH2CH2Cl | blue |
| 36 | -HNCH2CH2CO2N(CH3)2 | -OH | blue |
| 37 | -HNCH2CH2SO2NH2 | -OH | blue |

EXAMPLE 38

25 parts of 1,5-dihydroxy-4-anilino-8-aminoanthraquinone is stirred into a mixture of 250 parts of toluene and 11 parts of dimethylformamide. 13 parts of thionyl chloride is dripped in at room temperature and then the whole is heated for 2 hours at 70°C. Suction filtration is carried out at room temperature and the residue is washed with acetone.

The residue, while still moist with acetone, is introduced into a mixture of 25 parts of ammonium formate and 250 parts of ethylene glycol monomethyl ether at room temperature. After having been stirred for 1 hour at room temperature the whole is heated for 3 hours at 100°C, cooled to room temperature, suction filtered, washed with methanol and water and dried. The dye obtained has the formula:

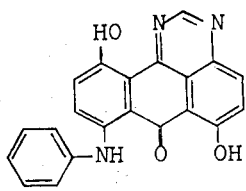

and dyes polyesters full blue shades. The yield is 20.2 parts of a dark blue powder.

EXAMPLE 39

22.6 parts of a mixture of about equal parts of 1,5-dihydroxy-4-(4'-anisidino)-8-aminoanthraquinone and 1,8-dihydroxy-4-(4'-anisidino)-5-aminoanthraquinone is stirred into a mixture of 210 parts of xylene and 9.2 parts of dimethylformamide. 10.7 parts of thionyl chloride is dripped in at room temperature and the whole is then heated for 2 hours at 70°C. Suction filtration is carried out at room temperature and the residue is washed with acetone.

The residue while still moist with acetone is introduced at room temperature into a mixture of 25 parts of ammonium formate and 250 parts of ethylene glycol monomethyl ether. After the whole has been stirred for 1 hour at room temperature it is heated for 3 hours at 100°C, cooled to room temperature, suction filtered, washed with methanol and water and dried. The dye mixture obtained which consists of the dyes of the formulae:

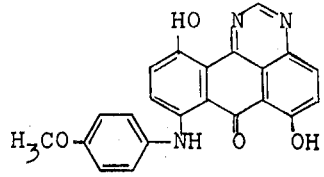 and 

dyes polyesters full blue green shades. The yield is 17.4 parts of a blue powder.

EXAMPLE 40

15.4 parts of a mixture of about equal parts of 1,5-dihydroxy-4-(3-sulfonamidoanilino)-8-aminoanthraquinone and 1,8-dihydroxy-4-(3-sulfonamidoanilino)-5-aminoanthraquinone is stirred into a mixture of 125 parts of toluene and 5.3 parts of dimethylformamide. 6.7 parts of thionyl chloride is dripped in at room temperature and then the whole is heated for 2 hours at 70°C. Suction filtration is carried out at room temperature and the residue is washed with acetone.

The residue while still moist with acetone is introduced at room temperature into a mixture of 12.5 parts of ammonium formate and 125 parts of ethylene glycol monomethyl ether, stirred for 1 hour at room temperature, heated for 3 hours at 100°C, cooled to room temperature, suction filtered, washed with methanol and water and dried. The dye mixture obtained, which contains the dyes of the formulae:

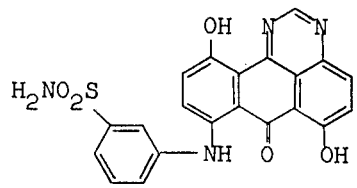 and 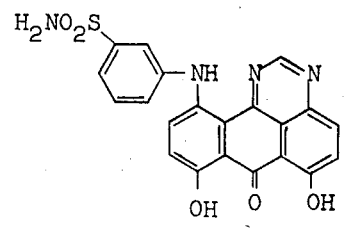

dyes polyesters full blue shades. The yield is 14.9 parts.

EXAMPLE 41

27.5 parts of 1,8-dihydroxy-4-(3'-chloroanilino)-5-aminoanthraquinone is stirred into a mixture of 250 parts of toluene and 11 parts of dimethylformamide. 13 parts of thionyl chloride is dripped in at room temperature and then the whole is heated for 2 hours at 70°C. Suction filtration is carried out at room temperature and the residue is washed with acetone.

The residue while still moist with acetone is introduced at room temperature into a mixture of 25 parts of ammonium formate and 250 parts of ethylene glycol monoethyl ether, stirred for 1 hour at room temperature, heated for 3 hours at 120°C, cooled to room temperature, suction filtered, washed with methanol and water and dried. 23.1 parts of the dye of the formula:

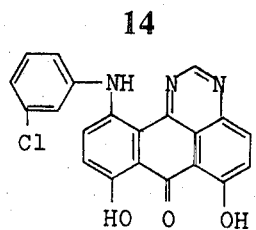

is obtained; it dyes polyesters full blue shades.

The dyes set out in the following Table are obtained by a method analogous to that described in Example 41:

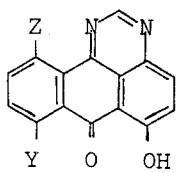

| Example | Y | Z | Shade on polyester |
|---|---|---|---|
| 42 | -HN-C₆H₄(o-CH₃) | -OH | blue |
| 43 | -HN-C₆H₄(m-CH₃) | -OH | blue |
| 44 | -HN-C₆H₄(p-CH₃) | -OH | blue |
| 45 | -OH | -HN-C₆H₄(p-CH₃) | blue |
| 46 | -OH | -HN-C₆H₄(p-CH₂CH₂OH) | blue |
| 47 | -HN-C₆H₄(o-Cl) | -OH | blue |
| 48 | -HN-C₆H₄(p-Cl) | -OH | blue |
| 49 | -HN-C₆H₄(o-OCH₃) | -OH | blue |
| 50 | -OH | -HN-C₆H₄(m-OCH₃) | blue |
| 51 | -HN-C₆H₃(3-Cl, 4-OCH₃) | -OH | blue |

-Continued

| Example | Y | Z | Shade on polyester |
|---|---|---|---|
| 52 | -HN-C6H4-OC2H5 (para) | -OH | blue green |
| 53 | -HN-C6H3(OCH3)2 (with H3CO and OCH3) | -OH | blue green |
| 54 | -OH | -HN-C6H4-SO2NH2 | blue |
| 55 | -OH | -S-C6H5 | blue violet |
| 56 | -HN-C6H4-CO2CH3 | -OH | blue |
| 57 | -OH | -HN-C6H4-CONH(CH2)3CH3 | blue |
| 58 | -OH | -HN-C6H4-CF3 | blue |
| 59 | -OH | -HN-C6H3(NO2)(CH3) | blue |

EXAMPLE 60

21.6 parts of 1,4-dihydroxy-5-amino-8-(β-chloropropionylamino)-anthraquinone is stirred into a mixture of 250 parts of toluene and 9.2 parts of dimethylformamide. 10.7 parts of thionyl chloride is dripped in at room temperature and the whole is then heated for 2 hours at 70°C. Suction filtration is carried out at room temperature and the residue is washed with acetone.

The residue is introduced while still moist with acetone into a mixture of 25 parts of ammonium formate and 250 parts of ethylene glycol monomethyl ether, stirred for 1 hour at room temperature, heated for 3 hours at 70°C, cooled to room temperature, suction filtered, washed with methanol and water and dried. The dye of the formula:

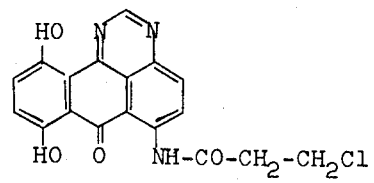

obtained dyes polyesters full red shades. The yield is 17.9 parts.

The dyes set out in the following Table are obtained by a method analogous to that described in the preceding Example:

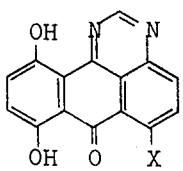

| Example | X | Shade on polyester |
|---|---|---|
| 61 | -HNOCCH3 | red violet |
| 62 | -HNOCCH2Cl | red violet |
| 63 | -HNOCCH2CH2CH3 | red violet |
| 64 | -HNCOCH2CH(CH3)2 | red violet |

| Example | X | Shade on polyester |
|---|---|---|
| 65 | 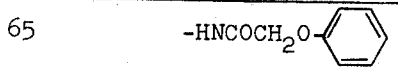 -HNCOCH₂O- | red violet |
| 66 | 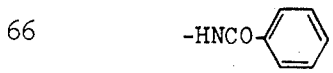 -HNCO- | red violet |
| 67 | 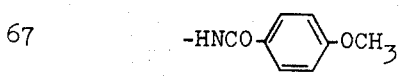 -HNCO- -OCH₃ | red violet |
| 68 | 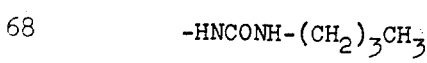 -HNCONH-(CH₂)₃CH₃ | red violet |

EXAMPLE 69

10 parts of 1,5-dihydroxy-4-anilino-8-aminoanthraquinone, 50 parts of formamide and 2.5 parts of nitrobenzene are heated for 6 hours at 175°C, cooled to room temperature and poured into ice-water. The precipitate is suction filtered, washed with water and dried. The isolated product contains the dye of the formula:

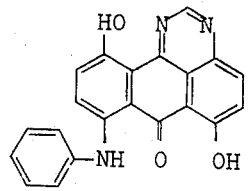

and dyes polyesters full blue shades. The yield is 9.6 parts.

EXAMPLE 70

10 parts of 1,8-dihydroxy-4-(3'-toluidino)-5-aminoanthraquinone, 50 parts of formamide and 2 parts of chloroanil are heated for 2 hours at 165°C and for 3 hours at 175°C, cooled to room temperature and poured into ice-water. The precipitate is suction filtered, washed with water and dried. 10.2 parts of the dye of the formula:

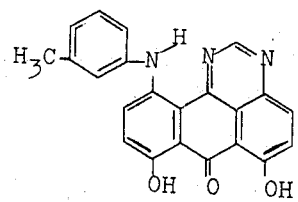

is obtained which dyes polyesters full blue shades.

EXAMPLE 71

10 parts of a mixture of about equal parts of 1,5-dihydroxy-4-(4'-chloroanilino)-8-aminoanthraquinone and 1,8-dihydroxy-4-(4'-chloroanilino)-5-aminoanthraquinone, 50 parts of formamide and 1 part of dimethylsulfoxide are heated for 5 hours at 175°C, cooled to room temperature and poured into ice-water. The precipitate is suction filtered, washed with water and dried. 8.7 parts of a mixture contining the dyes of the formulae:

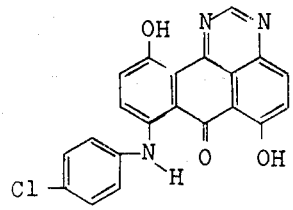 and 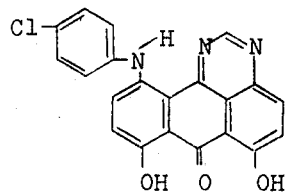

in about equal parts is obtained. The mixture dyes polyesters full blue shades.

EXAMPLE 72

10 parts of 1,5-dihydroxy-4-(3'-sulfamoylanilino)-8-aminoanthraquinone, 50 parts of formamide and 4 parts of m-nitrobenzenesulfonic acid sodium salt are heated for 3 hours at 165° to 175°C, cooled to room temperature and poured onto ice-water. The precipitate is suction filtered, washed with water and dried. The product obtained contains the dye of the formula:

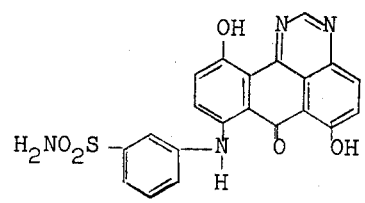

and dyes polyesters full blue shades. The yield is 10.3 parts.

EXAMPLE 73

10 parts of a mixture of about equal parts of 1,5-dihydroxy-4-(3'-(N-methylsulfonamido)-anilino)-8-aminoanthraquinone and 1,8-dihydroxy-4-(3'-(N- methylsulfonamido)-anilino)-5-aminoanthraquinone, 50 parts of formamide and 4 parts of sodium m-nitrobenzene sulfonate are heated for 3 hours at 165° to 166°C, cooled to room temperature and poured into ice-water. The precipitate is suction filtered, washed with water and dried. The product obtained contains a mixture of the dyes of the formulae:

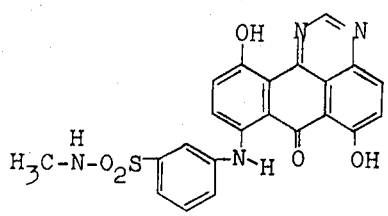 and 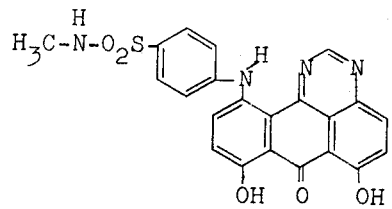

and dyes polyester in full blue shades. The yield is 10.0 parts.

EXAMPLE 74

10 parts of 1,5-dihydroxy-4-(3'-(N-n-porpylsulfonamido)-anilino)-8-aminoanthraquinone, 50 parts of formamide and 4 parts of sodium m-nitrobenzenesulfonate are heated for 3 hours at 165° to 167°C, cooled to room temperature and poured into ice-water. The precipitate is suction filtered, washed with water and dried.

The product obtained contains the dye of the formula:

and dyes polyesters full blue shades. The yield is 10 parts.

The dyes set out in the following Table are obtained by a method analogous to that described in Example 6:

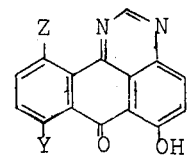

by starting from the appropriate aminoanthraquinones.

| Example | Y | Z | shade on polyester |
|---|---|---|---|
| 75 | -HN-⌬-SO₂NH(CH₂)₃-CH₃ | -OH | blue |
| 76 | -OH | -HN-⌬-SO₂-NHCH₂CH(CH₃)₂ | blue |
| 77 | -OH | -HN-⌬-SO₂NH(CH₂)₂CH(CH₃)₂ | blue |
| 78 | -OH | -HN-⌬-SO₂NHCH₂C(CH₃)₂CH₂OH | blue |
| 79 | -HN-⌬-SO₂NH(CH₂)₂OCH₃ | -OH | blue |
| 80 | -HN-⌬-SO₂N(CH₃)(CH₂CH₂OH) | -OH | blue |
| 81 | -HN-⌬-SO₂N(CH₂CH₃)₂ | -OH | blue |
| 82 | -OH | -HN-⌬-SO₂N(piperidino) | blue |
| 83 | -HN-⌬-SO₂N(morpholino) | -OH | blue |
| 84 | -HN-⌬-CONHCH₃ | -OH | blue |

—Continued

| Example | Y | Z | Shade on polyester |
|---|---|---|---|
| 85 | -OH | -HN-⌬-CONHCH₂CH₃ | blue |
| 86 | -HN-⌬-CONH(CH₂)₂CH₃ | -OH | blue |
| 87 | -HN-⌬-CONH(CH₂)₃OC₂H₅ | -OH | blue |
| 88 | -HN-⌬-CONH-⟨H⟩ | -OH | blue |
| 89 | -OH | -HN-⌬-CON(CH₂CH₃)₂ | blue |
| 90 | -HN-⌬-CON⟨H⟩ | -OH | blue |
| 91 | -HN-⌬-CO₂C₂H₅ | -OH | blue |
| 92 | -HN-⌬-CO₂(CH₂)₂OC₂H₅ | -OH | blue |
| 93 | -NH-⌬-SO₂-N⟨H⟩ | -OH | blue |
| 94 | -NH-⌬-COO(CH₂)₂-OC₄H₉ | -OH | blue |

We claim:
1. A dye of the formula:

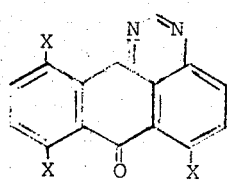

in which each of two of the radicals X is hydroxyl and the third X is a radical selected from the group consisting of:

alkylamino of one to eight carbon atoms in which one or two hydrogens may be replaced by hydroxyl, alkoxy of one to three carbon atoms, cyano, carboxamido, N,N-dimethylcarboxamido, alkoxycarbonyl of a total of two to five carbon atoms, sulfonamido, N,N-dimethylsulfonamido or pyrrolidon-2-yl-1;

phenylamino in which one or two hydrogens in the phenyl radical may be replaced by chlorine, bromine, hydroxyl, trifluoromethyl, nitro, sulfonamido or sulfonamido which is substituted on its nitrogen atom by alkyl of 1 to 8 carbon atoms or by alkoxyalkyl of 3 to 8 carbon atoms or which forms the amide with the nitrogen atom of piperidine or pyrrolidine or morpholine, carboxamido or N-alkylcarboxamido of a total of 2 to 7 carbon atoms, alkoxycarbonyl of a total of two to five carbon atoms, methyl, ethyl, methoxy or ethoxy;

phenylthio;

alkanoylamino of two to six carbon atoms in which one or two hydrogen atoms may be replaced by chlorine, bromine, methyl, ethyl, methoxy or ethoxy;

cycloalkanoylamino of seven to eight carbon atoms;

benzoylamino in which one or two hydrogen atoms may be replaced by chlorine, bromine, methyl, ethyl, methoxy or ethoxy; and N'-alkylureido of two to five carbon atoms in the alkyl moiety.

2. A dye of the formula:

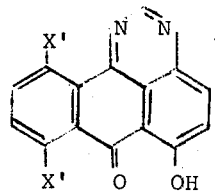

in which one X' is hydroxyl and the other X' is phenylamino in which one or two hydrogens in the phenyl radical may be replaced by chlorine, bromine, trifluoromethyl, nitro, sulfonamido or sulfonamido which is substituted on its nitrogen atom by alkyl of 1 to 8 carbon atoms or by alkoxyalkyl of 3 to 8 carbon atoms or which forms the amide with the nitrogen atom of piperidine or pyrrolidine or morpholine, carboxamido or N-alkylcarboxamido of a total of 2 to 7 carbon atoms, alkoxycarbonyl of a total of two to five carbon atoms, methyl, ethyl, methoxy or ethoxy.

3. A dye of the formula given in claim 2 in which one X' is hydroxyl and the other X' is 3-sulfonamidophenylamino of the formula:

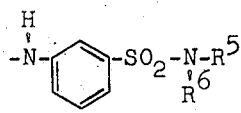

in which $R^5$ is hydrogen or alkyl of one to eight carbon atoms and $R^6$ is hydrogen or alkoxyalkyl of three to eight carbon atoms or

is piperidine, pyrrolidine or morpholine.

4. The dye of the formula:

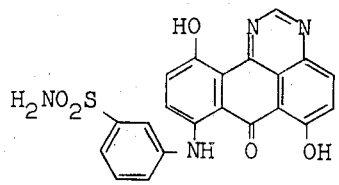

5. The dye of the formula:

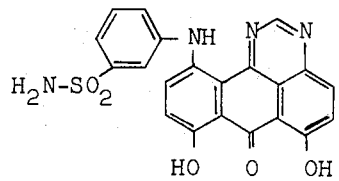

6. The dye of the formula:

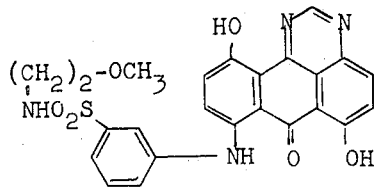

7. The dye of the formula:

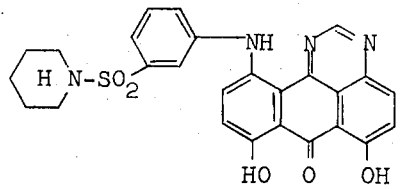

8. The dye of the formula:

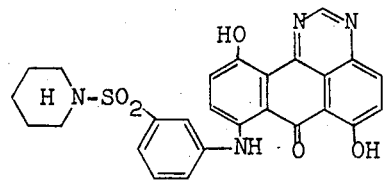

* * * * *

UNITED STATES PATENT AND TRADEMARK OFFICE
CERTIFICATE OF CORRECTION

PATENT NO. : 3,862,944
DATED : January 28, 1975
INVENTOR(S) : Heinz Eilingsfeld et al It is certified that error appears in the above-identified patent and that said Letters Patent are hereby corrected as shown below:

In the Heading, insert --Foreign Application Priority Date   May 18,1971   Germany   P 21 24 589.6--

In Column 2, Lines 36 & 37, delete "$\beta$-chlorobutyrylamino" and substitute --$\gamma$-chlorobutyrylamino--

In Column 4, Line 24, delete " (the $\beta$-aminoanthraquinone..." and substitute -- (the $\alpha$-aminoanthraquinone...--

In Column 4, Line 62, delete "...(2'-methylamilino)..." and substitute --...(2'-methylanilino)...--

In Column 7, Line 21, delete "washing it well. when an ..." and substitute --washing it well. When an ...--

Signed and Sealed this

Seventeenth Day of August 1976

[SEAL]

Attest:

RUTH C. MASON
Attesting Officer

C. MARSHALL DANN
Commissioner of Patents and Trademarks